United States Patent
Heubner

(10) Patent No.: US 9,803,705 B2
(45) Date of Patent: Oct. 31, 2017

(54) DEVICE FOR HYDRAULICALLY ACTUATING A MOTOR VEHICLE FRICTION CLUTCH

(71) Applicant: FTE automotive GmbH, Ebern (DE)

(72) Inventor: Wilhelm Heubner, Itzgrund (DE)

(73) Assignee: FTE automotive GmbH, Ebern (DE)

(*) Notice: Subject to any disclaimer, the term of this patent is extended or adjusted under 35 U.S.C. 154(b) by 0 days.

(21) Appl. No.: 15/115,035

(22) PCT Filed: Jan. 21, 2015

(86) PCT No.: PCT/EP2015/000104
§ 371 (c)(1),
(2) Date: Jul. 28, 2016

(87) PCT Pub. No.: WO2015/113744
PCT Pub. Date: Aug. 6, 2015

(65) Prior Publication Data
US 2016/0341265 A1    Nov. 24, 2016

(30) Foreign Application Priority Data
Jan. 30, 2014    (DE) .................. 10 2014 001 073

(51) Int. Cl.
*F16D 25/12*    (2006.01)
*F16D 48/06*    (2006.01)
*F16D 48/02*    (2006.01)

(52) U.S. Cl.
CPC ........... *F16D 48/066* (2013.01); *F16D 25/12* (2013.01); *F16D 2048/0224* (2013.01);
(Continued)

(58) Field of Classification Search
CPC ........... F16D 2048/0254; F16D 48/066; F16D 25/12; F16D 2500/3026
See application file for complete search history.

(56) References Cited

U.S. PATENT DOCUMENTS

| | | | |
|---|---|---|---|
| 5,135,091 A | * | 8/1992 | Albers .................... F16D 48/04 192/83 |
| 5,850,898 A | | 12/1998 | Bohme et al. |

(Continued)

FOREIGN PATENT DOCUMENTS

| | | |
|---|---|---|
| DE | 35 45 500 A1 | 7/1987 |
| DE | 196 52 785 A1 | 6/1998 |

(Continued)

OTHER PUBLICATIONS

PCT International Search Report and Written Opinion, Application No. PCT/EP2015/000104, Applicant: FTE automotive GmbH, dated Jun. 23, 2015, 10 pages.

(Continued)

*Primary Examiner* — Logan Kraft
*Assistant Examiner* — Abiy Teka
(74) *Attorney, Agent, or Firm* — Reising Ethington, P.C.

(57) ABSTRACT

A hydraulic actuation device for a motor vehicle friction clutch has a manually actuatable master cylinder, that has a master pressure chamber which, in a rest position, is fluidically connected to a reservoir. The master cylinder is connected to a slave arrangement that is functionally connected to the motor vehicle friction clutch. A pressure line connects the master pressure chamber to the slave arrangement and in which incorporates an electrically actuatable valve arrangement with an electrically actuatable proportional valve and, connected in parallel, a first check valve which blocks in the direction of the master pressure chamber. A motor pump is connected, on the input side, to the reservoir and can be connected, on the output side, to the pressure line between the valve arrangement and the slave pressure chamber through a second check valve that blocks in the direction of the motor pump.

16 Claims, 3 Drawing Sheets

(52) U.S. Cl.
CPC ............... *F16D 2048/0254* (2013.01); *F16D 2048/0263* (2013.01); *F16D 2048/0266* (2013.01); *F16D 2048/0275* (2013.01); *F16D 2500/1024* (2013.01); *F16D 2500/1045* (2013.01); *F16D 2500/3026* (2013.01); *F16D 2500/31413* (2013.01); *F16D 2500/5016* (2013.01); *F16D 2500/50203* (2013.01); *F16D 2500/7042* (2013.01); *F16D 2500/70422* (2013.01); *F16D 2500/70424* (2013.01)

(56) References Cited

U.S. PATENT DOCUMENTS

| | | | |
|---|---|---|---|
| 5,944,159 A * | 8/1999 | Schneider | F15B 1/033 192/85.56 |
| 6,170,624 B1 | 1/2001 | Arai et al. | |
| 6,390,267 B1 | 5/2002 | Elflein | |
| 6,883,658 B2 | 4/2005 | Reul et al. | |
| 6,951,104 B2 | 10/2005 | Stobrawe et al. | |
| 7,170,278 B2 | 1/2007 | Wohner | |
| 9,045,140 B2 | 6/2015 | Iwao et al. | |

FOREIGN PATENT DOCUMENTS

| | | |
|---|---|---|
| DE | 197 16 473 A1 | 10/1998 |
| DE | 198 56 587 A1 | 6/1999 |
| DE | 102 50 729 A1 | 5/2004 |
| DE | 20 2006 014 024 U1 | 11/2006 |
| DE | 10 2007 002 842 A1 | 11/2007 |
| WO | WO 00/24603 A1 | 5/2000 |

OTHER PUBLICATIONS

German Office Action dated Oct. 20, 2014, Application No. 10 2014 001 073.2, Applicant: FTE automotive GmbH, 5 pages.
International Preliminary Report on Patentability, Application No. PCT/EP2015/000104, Applicant: FTE Automotive GmbH, dated Aug. 2, 2016, Translation, 5 pages.

* cited by examiner

DEVICE FOR HYDRAULICALLY ACTUATING A MOTOR VEHICLE FRICTION CLUTCH

TECHNICAL FIELD

The present invention relates to a device for hydraulic actuation of a motor vehicle friction clutch. In particular, the invention relates to such a device as used in motor vehicles with extended start/stop systems and for that purpose allowing manual as well as automatic hydraulic actuation of the motor vehicle friction clutch.

PRIOR ART

A conventional hydraulic clutch actuation for motor vehicles has a master cylinder, which is connected with an equalizing reservoir filled with hydraulic fluid and which can be actuated, for example, by way of a clutch pedal. The master cylinder is hydraulically connected with a slave cylinder by way of a pressure line so that the pressure generated in the master cylinder by depressing the clutch pedal is transmissible to the slave cylinder by way of the fluid column in the pressure line. As a result, the release bearing of the motor vehicle friction clutch is acted on by the slave cylinder with an actuating force so as to separate the clutch pressure plate from the driven clutch plate by way of a release mechanism and thus to separate the engine from the transmission of the motor vehicle.

It has already been proposed (see, for example, specifications DE 41 21 016 A1 and DE 10 2007 002 842 A1) for dual manual/automatic hydraulic actuation of the motor vehicle friction clutch to extend the hydraulic clutch actuation by a hydraulic pressure source (e.g. motor pump) which can be placed in fluid connection by way of an electrically controllable valve arrangement with the pressure line between the manually actuable master cylinder and the slave cylinder. There are multiple reasons for dual manual/automatic actuation of the motor vehicle friction clutch For example, it is desired to apply known start/stop systems of motor vehicles with manual transmissions, in which for reduction in fuel consumption the internal combustion engine is switched off when changing into the neutral setting and separating the clutch and is switched on again when the clutch pedal is actuated. For another example, it is desired to apply so-called start/stop in gear systems to manual transmissions, in which for switching-off the internal combustion engine it is no longer necessary to change into the neutral setting (see, for example, specification WO 2000/24603 A1). Another example is for allowing a so-called motorless operation, i.e. rolling with engaged gear and switched-off internal combustion engine. A dual manual/automatic clutch actuation makes it possible to prevent, damage and excessive wear due to misuse, e.g. starting in an incorrect gear, clutch grabbing or not fully pressing the clutch pedal. In addition, it is also possible to realize assistance systems which through suitable intervention in the clutch actuation enable, for example, enhanced comfort in stop and go traffic, prevent stalling of the internal combustion engine or avoid undesirable conditions (see specification DE 10 2007 002 842 A1), in that after recognition of a critical travel situation, for example a risk of collision, by a sensor system the internal combustion engine is decoupled from the drive wheels by automatic disengagement of the clutch so that the internal combustion engine can no longer reduce the effect of a service brake of the motor vehicle.

With respect to the device as disclosed in specification DE 10 2007 002 842 A1, a hydraulic clutch actuation has a master unit, which is manually actuatable by way of a sensed pedal and has a piston work chamber, which in a rest setting is in fluid connection with a hydraulic reservoir by way of a replenishing region. Further, a slave unit is provided which has a piston work chamber and which is operatively connected with the motor vehicle friction clutch. Furthermore, there is a pressure line for hydraulic connection of the piston work chambers of master unit and slave unit. Moreover, a hydraulic pump hydraulically connected at the inlet side with the hydraulic reservoir and drivable by electric motor is provided. The pump outlet of the pump is hydraulically connected with the pressure line, serving for which is an electrically actuable control valve arrangement connected into the pressure line. Finally, the prior art system has a control unit (CAN bus, control circuit) with which the pedal sensor, hydraulic pump and control valve arrangement for manual or automatic actuation of the motor vehicle friction clutch are electrically connected.

Appropriate function in the event of power supply failure is, in fact, known in the prior art through the use of a control valve arrangement being spring-biased into a setting connecting the piston work chambers of the master unit and slave unit. However, this prior art needs improvement inasmuch as it does not readily allow the driver to manually intervene in an automatic clutch process through pedal actuation.

The same applies to the prior art according to specification DE 41 21 016 A1. In addition, although the device disclosed there is, in terms of object, intended to combine the advantages of two actuating systems (automatic and manual), there is for that purpose a substantial outlay on technical hardware with multiple valve blocks and pressure or energy stores.

What is desired is to provide for hydraulic actuation of a motor vehicle friction clutch, a device which avoids the above disadvantages and which by comparison with the outlined prior art makes it possible, particularly with a simple construction, to carry out—for the most diverse purposes automatic clutch actuation processes wherein the driver can expeditiously manually intervene or operate at any time.

SUMMARY OF THE INVENTION

According to one embodiment of the invention a device for hydraulic actuation of a motor vehicle friction clutch has a manually actuatable master cylinder, the actuation of which is sensed by a sensor and which has a master pressure chamber which in a rest setting is in fluid connection with a reservoir by way of a replenishing region. A slave arrangement has a slave pressure chamber and includes at least one slave cylinder operatively connected with the motor vehicle friction clutch. A pressure line hydraulically connects the master pressure chamber with the slave pressure chamber. A motor pump is hydraulically connected at the inlet side with the reservoir and the pump outlet of which is hydraulically connectible with the pressure line. An electrically actuable valve arrangement is connected into the pressure line. A control unit is electrically connected with the sensor, the motor pump and the valve arrangement, for manual and/or automatic actuation of the motor vehicle friction clutch. The valve arrangement includes in parallel connection, an electrically actuable proportional valve and a first non-return valve which blocks in the direction of the master pressure chamber. The motor pump is hydraulically connected with the pressure line by way of a second non-return valve, which blocks in the direction of the motor pump, between the valve arrangement and the slave pressure chamber.

In other words, the electrically actuable valve arrangement divides the pressure line between master pressure chamber and slave pressure chamber into a line section at the master side and a line section at the slave side. Starting from not only the master cylinder (manually) by way of the master-side line section, but also the motor pump (automatically), by way of the pump outlet, volumes of hydraulic fluid can be displaced into or in the slave-side line section and pressure built up, which when the proportional valve is closed is trapped by the non-return valves with respect to the master cylinder or motor pump so as to load the slave pressure chamber and thus actuate, for example disengage, the motor vehicle friction clutch. Through selective actuation of the proportional valve and the defined opening thereof thus produced, it is then possible—without actuation of the master cylinder—either to maintain the slave-side pressure when, in a given case, the motor pump is running or to reduce it in defined manner by way of the proportional valve so as to, for example, re-engage the motor vehicle friction clutch, in which case the hydraulic fluid flowing out of the slave-side line section by way of the proportional valve returns to the reservoir by way of the master-side line section, the master pressure chamber and the appropriately dimensioned replenishing region of the master cylinder. In the case of manual actuation of the master cylinder the hydraulic connection between the master pressure chamber and the replenishing region of the master cylinder is interrupted in a manner known per se (for example by 'over-travel' of the replenishing bore, which is at the cylinder housing, by the primary sealing element at the piston or by a central valve in the master piston, which in the case of piston movement out of the rest setting automatically closes) so that hydraulic relief of the slave-side line section by way of the proportional valve is no longer possible. Thus, a switching valve function is also imparted to the master cylinder together with its replenishing system known per se, which function allows the driver to intervene at any time and directly, i.e. also very rapidly, in an automatic actuation of the motor vehicle friction clutch by manual (e.g. pedal) actuation of the master cylinder without additional valves and/or other components being needed for that purpose. Thus, with a very simple circuit format there is created a device, which is improved by comparison with the prior art outlined in the introduction, for hydraulic actuation of a motor vehicle friction clutch, by either manual or automatic actuation.

In principle, it is conceivable to construct the proportional valve so that it is spring-biased into a blocking zero setting. However, it is usually preferred if the proportional valve is spring-biased into the passage zero setting.

Moreover, it can be provided that the slave cylinder, which has a slave piston mechanically connected with the motor vehicle friction clutch, has an abutment serving the purpose of limiting actuation travel of the slave piston. It is thus possible in simple manner to prevent over-pressing of the motor vehicle friction clutch insofar as measures for limiting actuation travel are not undertaken at the clutch itself.

If the device is to be used for hydraulic actuation of a motor vehicle friction clutch with a constantly arising characteristic curve (for example with an approximately linear plot of actuation force over actuation travel) it is basically possible in a simplest embodiment of the device to dispense with a travel sensor at the slave arrangement. However, it is preferred if a travel sensor, which is electrically connected with the control unit and by which a slave-side actuation travel representative of a disengaged state of the motor vehicle friction clutch is detectable, is provided at the slave arrangement. This makes possible widely varied automatic actuations, optionally even overlapping manual actuation, of motor vehicle friction clutches with any desired characteristic curve, for example—as is frequently the case—extending in the form of an 'arched back'.

In further pursuance of one concept of the invention the slave arrangement can include a portioning cylinder, which is hydraulically connected upstream of the slave cylinder and which has the slave pressure chamber. Thus, in particular, existing clutch actuating systems can be widened in scope in simple manner while retaining the already provided master and slave cylinders so as to enable either manual or automatic clutch actuations.

Finally, in that regard it is advantageous if at least the reservoir, the motor pump, the second non-return valve and the portioning cylinder, optionally together with the travel sensor, are combined to form a module, which can be arranged in the motor vehicle in simple and assembly-friendly manner as well as independently of the positioning of the master and slave cylinders, for example at a location which is better protected relative to external influences (e.g. temperature, etc.) and which is more easily accessible and/or less confined. The module then preferably also includes the valve arrangement and optionally the control unit, so that the components provided for the automatic clutch actuation are integrated to the greatest degree.

BRIEF DESCRIPTION OF THE DRAWINGS

The invention is explained in more detail in the following on the basis of preferred embodiments with reference to the accompanying schematic drawings, in which the same reference numerals denote the same or corresponding parts and in which.

Figure 1:
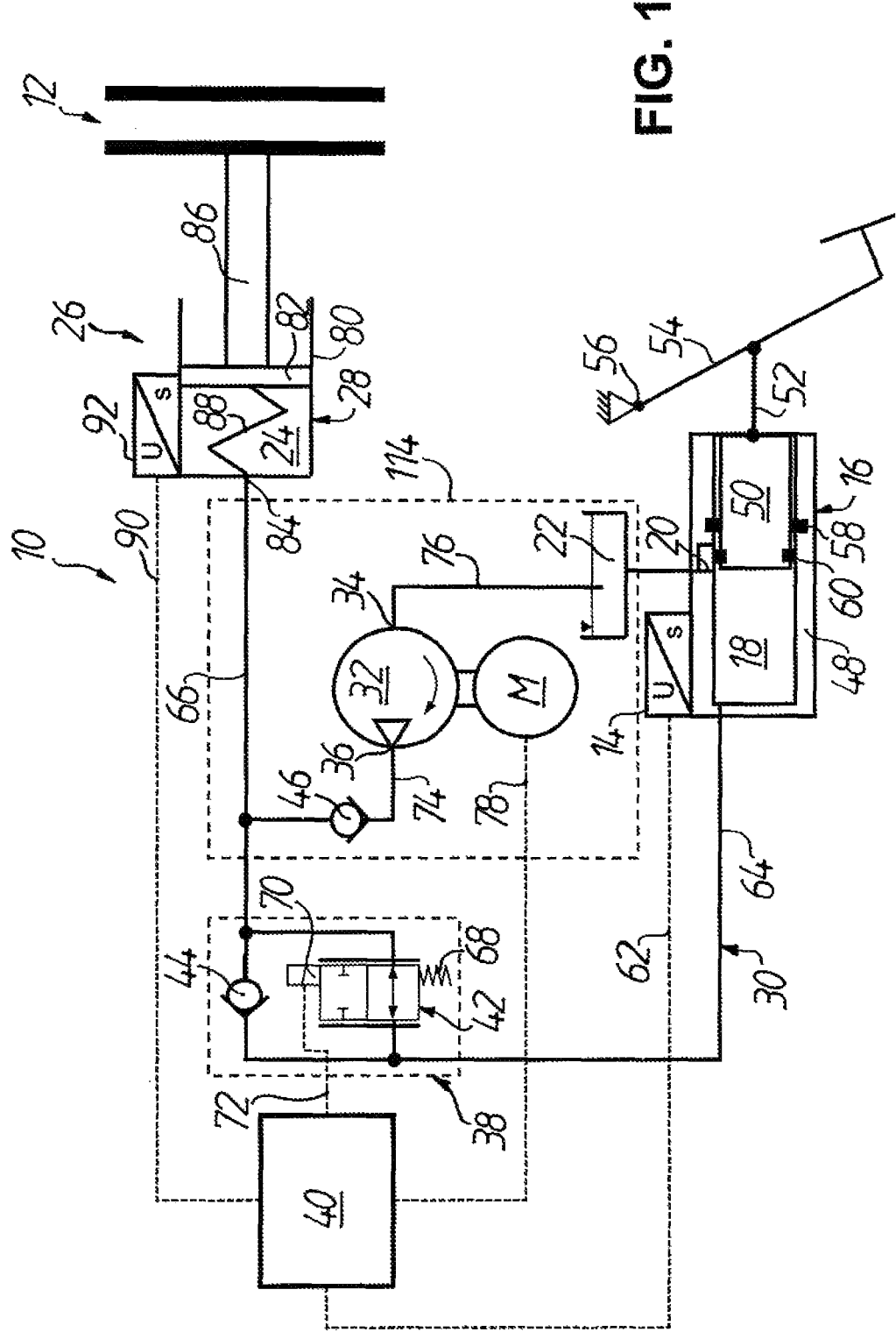
FIG. 1 shows a circuit diagram of a device for hydraulic actuation of a motor vehicle friction clutch according to a first embodiment of the invention, with a slave arrangement with sensed travel.

Illustration of details of the clutches and the elements (manual transmissions, internal combustion motor) operatively connected by way of the clutches has been dispensed with in the drawings and in the following description because these details or elements and the function thereof are sufficiently known to one ordinarily skilled in the art and explanations with respect thereto do not appear necessary for an understanding of the present invention.

DETAILED DESCRIPTION OF THE EMBODIMENTS

In FIG. 1, the reference numeral 10 denotes in general a device for hydraulic actuation of a motor vehicle friction clutch 12. As will be described in more detail in the following, the device 10 includes a manually activatable master cylinder 16, actuation of which is sensed by a sensor 14 and which has a master pressure chamber 18 which in a rest setting is in fluid connection with a reservoir 22 by way of a replenishing region 20. A slave arrangement 26 is provided which has a slave pressure chamber 24 and which has a or at least one slave cylinder 28 operatively connected with the motor vehicle friction clutch 12. A pressure line 30 hydraulically connects the master pressure chamber 18 with the slave pressure chamber 24. A motor pump 32 with an electric pump drive M has its pump inlet 34 is hydraulically connected with the reservoir 22, while its pump outlet 36 is hydraulically connectible with the pressure line 30. An electrically actuable valve arrangement 38 is connected into the pressure line 30. A control unit 40, is electrically connected to the sensor 14, the motor pump 32, i.e. the pump drive M thereof, and the valve arrangement 38 for manual and/or automatic actuation—which is still to be explained—of the motor vehicle friction clutch 12. It is significant that the valve arrangement 38 has, in parallel connection, an electrically actuable proportional valve 42 and a first non-return valve 44 blocking in the direction of the master pressure chamber 18, while the motor pump 32 is hydraulically connected with the pressure line 30 by way of a second non-return valve 46, which blocks in the direction of the motor pump 32, between the valve arrangement 38 and the slave pressure chamber 24. The non-return valves 44, 46 can be spring-biased into the respective closed settings thereof, but this is not illustrated in the figures.

The master cylinder 16 comprises, in a manner known per se, a master cylinder housing 48 which together with a master piston 50 bounds the master pressure chamber 18. A piston rod 52 is pivotably connected with the master piston 50 and with a pedal 54. The pedal 54 can be pivoted about a pivot bearing 56 by manual (foot) actuation so as to axially displace the master piston 50 in the master cylinder housing 48 by the piston rod 52 and thus build up a pressure in the master pressure chamber 18 as well as displace hydraulic fluid from the master pressure chamber 18 into the pressure line 30. A restoring spring, which is optionally provided at the pedal 54 or at or in the master cylinder 16, for the master piston 50 is not shown here.

In the illustrated embodiment the master piston 50 is a so-called shaft piston, in which a secondary sealing element 58, which seals the master cylinder 16 relative to the environment and which is fixed relative to the housing, co-operates with a guide surface provided at the piston shaft. A primary sealing element 60 is mounted at the piston head, and co-operates with a guide surface at the cylinder housing so as to seal the master pressure chamber 18 by the sealing element 60 after over-travel of the replenishing connection with the reservoir 22 (replenishing region 20). However, the master piston could equally well be a conventional classic piston which has two traveling primary and secondary sealing elements co-operating with a guide surface at the housing, or a so-called plunger piston, which has a piston guide surface co-operating at least with a primary sealing element fixed relative to the housing and at the pressure chamber side. In addition, the master cylinder piston could be provided with a central valve which in a rest setting of the master piston connects the master pressure chamber with the replenishing region. These known master cylinder variants have in common that when an axial displacement of the master piston in the master cylinder housing from its illustrated rest setting takes place at the replenishing region the connection with the reservoir is interrupted, whereupon a pressure builds up in the master pressure chamber.

In the present case, the sensor 14 is a sensor fixed relative to the cylinder housing and sensitive to magnetic flux, for example a Hall sensor, which co-operates with a signal element, which is mounted on the master piston 50, in the form of a permanent magnet (not shown) so as to detect a stroke s of the master piston 50. Sensor arrangements of that kind at hydraulic master cylinders are described in, for example, specifications EP 1 369 597 A2 and EP 1 489 385 A2 of the same applicant, to which reference is hereby expressly made with respect to constructional form and function. The sensor 14 delivers a travel-dependent voltage signal U which is conducted by way of an electrical signal line 62 to the electronic control unit 40.

The valve arrangement 38 divides, by its parallel connection of proportional valve 42 and first non-return valve 44, the pressure line 30 into a transmitter-side pressure line section 64 permanently connected with the master pressure chamber 18 and a slave-side pressure line section 66 constantly connected with the slave pressure chamber 24. The proportional valve 42 illustrated here is a 2/2-way proportional valve, which is spring-biased by way of a valve spring 68 into a zero setting allowing passage and can be closed in defined manner by an electromagnetic drive 70 against the force of the valve spring 68. For supply of current to the electromagnetic drive 70, this is connected with the control unit 40 by way of an electrical control line 72. As far as the constructional form of proportional valve 42 is concerned, this can be executed as, for example, an electromagnetically actuable 2/2-way ball-seat valve spring-biased into a passage zero setting, as is known in principle from DE 196 33 420 A1 (see FIG. 4 thereof) of the same applicant.

The pump outlet 36 of the motor pump 32 is connected with the slave-side pressure line section 66 by way of a conveying line 74 into which the second non-return valve 46 is so connected that it blocks in the direction of the motor pump 32. The pump inlet 34 of the motor pump 32 is in permanent fluid connection with the reservoir 22 by way of a suction line 76. For supply of current to or activation of the electrical pump drive M this is connected with the control unit 40 by way of an electrical control line 78. Pump types such as, for example, gear pumps, roller cell pumps, vane cell pumps and radial or axial piston pumps can be used for the motor pump 32 insofar as they are in a position of generating pressures (up to 40 bars) usual for hydraulic clutch actuations. For the present use it is in principle sufficient if the motor pump 32 is constructed as a constant conveying pump which supplies a constant volume flow for a predetermined rotational speed of the pump drive M. The pump drive M can optionally be controllable in rotational speed so as to be able to react to possible fluctuations in pressure and to also make possible, by low rotational speeds, a finely meterable 'introduction' or 'topping up' of hydraulic fluid.

The slave cylinder 28 comprises, in a manner known per se, a slave cylinder housing 80 in which a slave piston 82 is guided to be longitudinally displaceable and sealed at the circumference, (in a manner not shown in more detail) relative to the slave cylinder housing 80. The slave piston 82 together with the slave cylinder housing 80 here bounds the slave pressure chamber 24, which can be loaded with the hydraulic fluid by way of a pressure connection 84. For this purpose, the pressure line 30 is connected by its slave-side pressure line section 66 with the pressure connection 84. Mounted on the slave piston 82 at the side thereof remote from the slave pressure chamber 24 is a piston rod 86 by way of which the slave cylinder 28 is in operative connection in a manner known per se with the friction clutch 12, wherein a compression spring 88 arranged in the slave pressure chamber 24 keeps the participating components at the cylinder side and clutch side in contact.

In the illustrated embodiment, a travel sensor 92 electrically connected with the control unit 40 by way of a signal line 90 is provided at the slave arrangement 26, more precisely the slave cylinder housing 80, by which sensor an actuation travel s, which is representative of a disengaged state of the friction clutch 12, at the slave side is detectable. As with the master cylinder 16, in that case it can be a sensor which is fixed relative to the cylinder housing and sensitive to magnetic flux, for example a Hall sensor, which co-operates with a signal element—which is mounted on the slave piston 82—in the form of a permanent magnet (not illustrated) so as to detect the actuation travel s of the slave piston 82.

Even though in the illustrated embodiment the slave cylinder 28 is illustrated in 'classic' mode of construction, it can similarly be—and by virtue of its very compact annular construction may in general even be preferred in an actual application—a so-called central disengager or a central engager such as described in principle in, for example, specifications DE 197 16 473 A1 and DE 199 44 083 A1 of the same applicant which are hereby incorporated by reference. In addition, specifications DE 102 22 730 A1 and DE 20 2006 014 024 U1 of the same applicant are also hereby incorporated by reference with respect to the construction and function of central disengagers with sensed travel.

Before the function—which with respect to important points is the same for the different embodiments—of the hydraulic actuating device 10 is explained, it shall be briefly described in the following how the second and third embodiments according to FIGS. 2 and 3 differ from the previously described first embodiment (FIG. 1).

Figure 2:
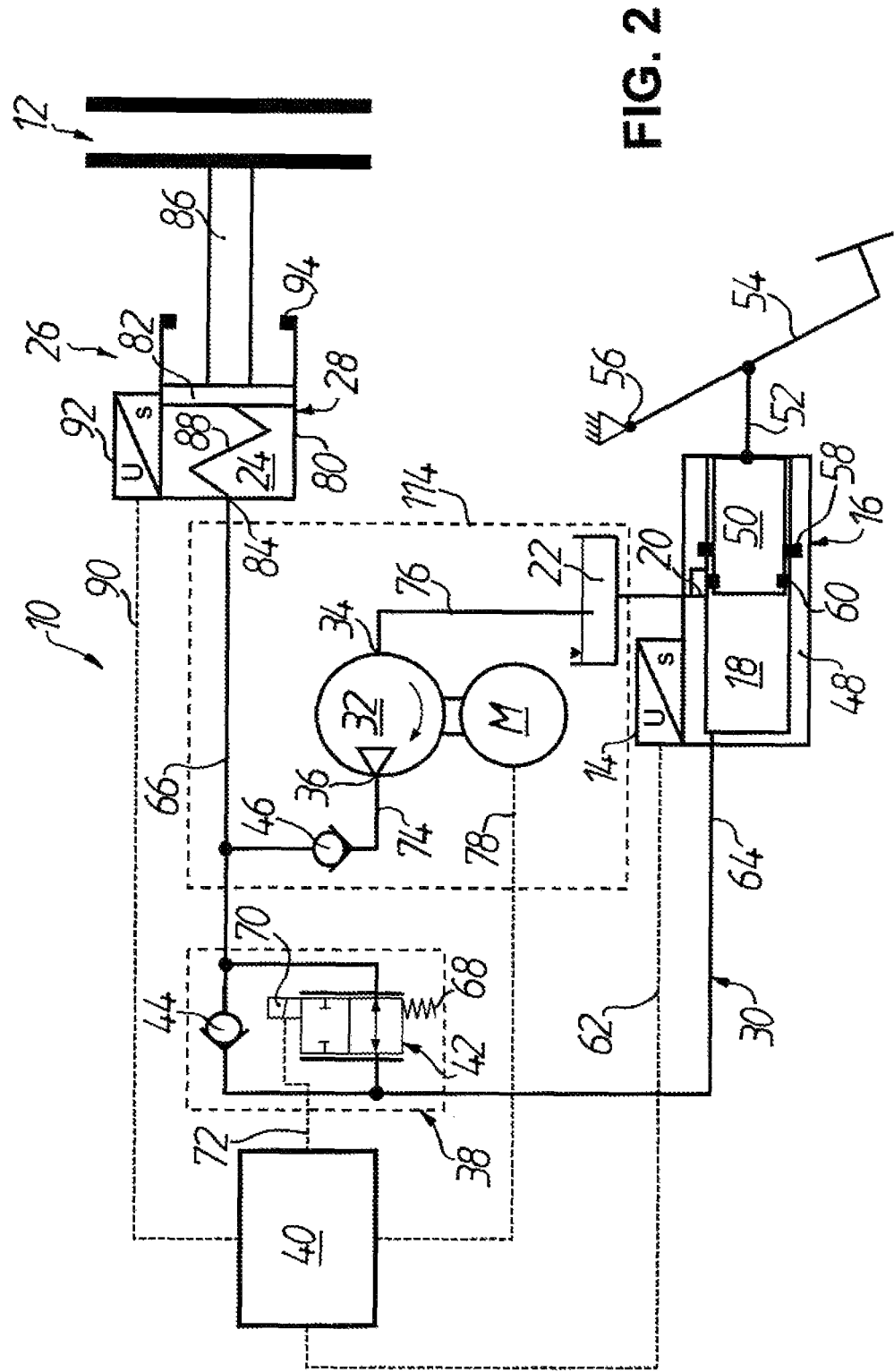
FIG. 2 shows a circuit diagram of a device for hydraulic actuation of a motor vehicle friction clutch according to a second embodiment of the invention, with an abutment, which is additional by comparison with the first embodiment, for limitation of actuation travel of the slave arrangement.

In the second embodiment according to FIG. 2 the slave cylinder 28 has an abutment 94 serving the purpose of limiting the actuation travel s of the slave piston 82 mechanically connected with the friction clutch 12 by way of the piston rod 86. As shown here, the abutment 94 can be of annular construction and mounted in suitable manner on the inner circumference of the slave cylinder housing 80 and, in particular, as seen in axial direction at a place of the slave cylinder 28 at which the hydraulically loaded slave piston 82 comes into contact with the abutment 94 before the piston rod 86 can be moved too far out of the slave cylinder housing 80. An 'overrunning' and thus possible accompanying damage of the friction clutch 12 can thus be reliably prevented in simple manner.

Figure 3:
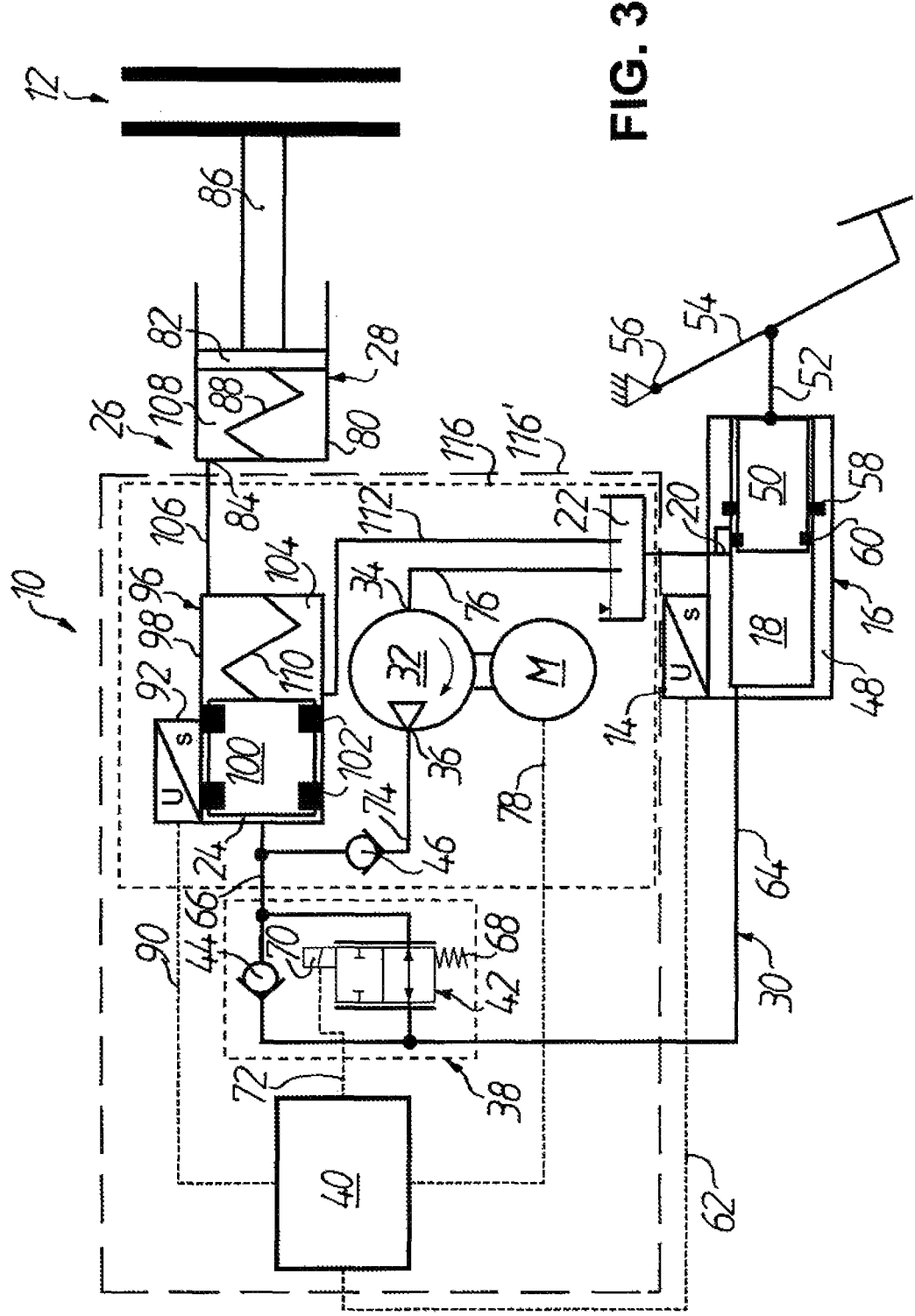
FIG. 3 shows a circuit arrangement of a device for hydraulic actuation of a motor vehicle friction clutch according to a third embodiment of the invention, in which the slave arrangement comprises a portioning cylinder hydraulically connected upstream of the slave cylinder.

In the third embodiment illustrated in FIG. 3 the slave arrangement 26 comprises a portioning cylinder 96, which as seen from the direction of the master cylinder 16 is hydraulically connected upstream of the slave cylinder 28 and has the slave pressure chamber 24. A separating piston 100 is received in a cylinder housing 98 of the portioning cylinder 96 to be longitudinally displaceable and is provided at the piston circumference with two axially mutually spaced-apart sealing elements 102 which provide a sliding seal relative to a guide surface at the inner circumference of the cylinder housing 98. In the cylinder housing 98 the separating piston 100 separates the slave pressure chamber 24 of the slave arrangement 26 from a further master pressure chamber 104, which for its part is in permanent communication by way of a further pressure line 106 with a further slave pressure chamber 108 in the slave cylinder 28 operatively connected with the friction clutch 12.

A compression spring 110 received in the further master pressure chamber 104 biases the separating piston 100 in the direction of the slave pressure chamber 24, i.e. into the illustrated rest setting to the left in FIG. 3. In the rest setting of the separating piston 100 the further master pressure chamber 104 is in fluid connection with the reservoir 22 by way of a replenishing line 112 so as to provide compensation for temperature expansions, wear travel, etc., at the friction clutch 12 or the slave cylinder 28. In this embodiment the slave arrangement 26 thus includes the slave cylinder 28, the portioning cylinder 96 having the slave pressure chamber 24, the further pressure line 106 between the cylinders 28, 96, and the replenishing line 112 from the reservoir 22 to the further master pressure chamber 104 in the portioning cylinder 96.

When the slave pressure chamber 24 is subjected to hydraulic loading by way of the slave-side pressure line section 66 of the pressure line 30 the separating piston 100 moves to the right in FIG. 3 against the force of the compression spring 110, in which case the sealing element 102 at the master pressure chamber side, i.e. at the right in FIG. 3, separates the replenishing connection with the reservoir 22 so that a pressure can build up in the further master pressure chamber 104. This hydraulic pressure for its part is present, by way of the further pressure line 106, in the further slave pressure chamber 108 and can there act on the slave piston 82 of the slave cylinder 28 to be effective in terms of actuation. Since in that case the separating piston 100 cannot displace in the portioning cylinder 96 to an arbitrary extent, the portioning cylinder 96 also has a stop function analogous to the abutment 94 in the second embodiment according to FIG. 2.

Moreover, in the illustrated embodiment the afore-described travel sensor 92 is provided at the portioning cylinder 96, i.e. fastened to the cylinder housing 98 thereof, and co-operates with a signal element (not shown) at the separating piston 100 so as to detect the stroke of the separating piston 100, which by virtue of the hydraulic connection of the portioning cylinder 96 with the slave cylinder 28 is representative of a disengagement state or an engagement state of the friction clutch 12.

Finally, with regard to the different embodiments mention may be made of the modular construction of the circuit. Whereas in the embodiments according to FIGS. 1 and 2 the reservoir 22, the motor pump 32 with the electric pump drive M, the second non-return valve 46 and the associated hydraulic connections are combined to form a module 114, which can optionally also include the valve arrangement 38 and the control unit 40, in the third embodiment according to FIG. 3 the reservoir 22, the motor pump 32 together with the electric pump drive M, the second non-return valve 46, the portioning cylinder 96 with the travel sensor 92 (if present) and the associated hydraulic connections are combined to form a module 116. As indicated at 116', this module can in addition include the valve arrangement 38 and the control unit 40, so that only the module 116' would have to be inserted as a separate component between the master cylinder and the slave cylinder of a conventional manually actuable hydraulic clutch actuation system in order to also realize manual and automatic clutch actuations.

The function of the hydraulic actuating device 10 shall be briefly explained in the following for all embodiments in common, wherein distinction shall be made between the cases of (A) manual actuation, (B) 'jackrabbit start' prevention, (C) automatic actuation and (D) 'overlapping' actuations.

(A) Manual actuation: The master cylinder 16 is manually actuated by way of the pedal 54. The hydraulic fluid displaced from the master pressure chamber 18 by the master piston 50 travels by way of the master-side pressure line section 64, the current-free open proportional valve 42 and/or the first non-return valve 44 of the valve arrangement 38 and the slave-side pressure line section 66 of the pressure line 30 to the slave pressure chamber 24 in the slave cylinder 28 (FIGS. 1 and 2) or into the intermediate metering or portioning cylinder 96 (FIG. 3). As a result, the slave piston 82 is directly (FIGS. 1 and 2) or indirectly (FIG. 3: by way of the separating piston 100, the further master pressure chamber 104, the further pressure line 106 and the further slave pressure chamber 108) hydraulically loaded and displaced so as to disengage the friction clutch 12.

When a return stroke (release of the pedal 54) takes place, the hydraulic fluid flows back from the slave pressure chamber 24 by way of the slave-side pressure line section 66, the current-free open proportional valve 42 of the valve arrangement 38 and the master-side pressure line section 64 of the pressure line 30 into the master pressure chamber 18 of the master cylinder 16. Volume equalization to provide compensation for thermal expansions, wear of the friction clutch 12 or deformations of the friction clutch 12 at high rotational speeds takes place by way of the equalization system of the master cylinder 16 (replenishing region 20) or of the portioning cylinder 96 (replenishing line 112) in the case of FIG. 3.

(B) 'Jackrabbit start' prevention (also termed 'Peak Torque Limiter' (PTL) function in the technical terminology): If by the travel sensor(s) 14, 92 at the master cylinder 16 and/or slave cylinder 28 or portioning cylinder 96 there is recognition of excessive closing speeds of the friction clutch 12, with the risk of occurrence of excessive peak torques caused by the stored energy in the inertial masses of clutch and internal combustion engine, the proportional valve 42 of the valve arrangement 38 can be entirely or partly closed by appropriate activation of the electromagnetic drive 70 by way of the control unit 40 and the closing speed of the friction clutch 12 can be regulated to a tolerable amount.

(C) Automatic actuation: The electric pump drive M of the motor pump 32 and the proportional valve 42 of the valve arrangement 38, more specifically the electromagnetic drive 70 thereof, are activated by way of the electronic control unit 40, which also reads in the signals of the travel sensors 14, 92 (and/or optionally present pressure sensors). If the control unit 40 receives a command for opening or disengagement of the friction clutch 12, it switches on the electric pump drive M, whereupon hydraulic fluid is sucked by the motor pump 32 from the reservoir 22 via the suction line 76 and conveyed by way of the conveying line 74 and the second non-return valve 46 into the slave-side pressure line section 66 of the pressure line 30, and it supplies current to the electromagnetic drive 70 of the proportional valve 42 at a value corresponding with the anticipated need. The proportional valve 42 remains closed until the pressure, which corresponds with the supplied current, in the slave-side pressure line section 66 is reached and the proportional valve 42 automatically opens so as to maintain force equilibrium between magnetic force and the hydraulic forces at the proportional valve 42 (dynamic pressure principle), or the required position is reported by the travel sensor 92 to the control unit 40 and the valve current at the proportional valve 42 is withdrawn by way of the control unit 40. In this case, the motor pump 32 can be switched off, the hydraulic pressure in the system being maintained by way of the closed proportional valve 42 and the two non-return valves 44, 46.

If the friction clutch 12 is to be closed again or re-engaged, then the valve current in the proportional valve 42 is reduced by the control unit 40 and the movement of the slave piston 82 in the slave cylinder 28 is suitably regulated with the assistance of the travel signals of the travel sensor 92. The hydraulic fluid in that case flows from the proportional valve 42 via the master-side pressure line section 64 of the pressure line 30, the master pressure chamber 18 of the master cylinder 16 disposed in the rest setting and the appropriately dimensioned equalization system thereof (replenishing region 20) back into the reservoir 22.

Overlapping actuations: Manual actuation (see A) is reported by the travel sensor 14 of the master cylinder 16 to the control unit 40. Automatic actuations (see C) can therefore be excluded by way of the control unit 40 if an ongoing manual actuation is present. However, it can also be advantageous, for example for protection of the friction clutch 12 against excessive wear, to entirely open an incompletely opened or disengaged friction clutch 12 in appropriate situations. In this case, the electromagnetic drive 70 of the proportional valve 42 would be supplied with current by the control unit 40, which switches on the electric pump drive M of the motor pump 32 and admeters hydraulic fluid until the friction clutch 12 is fully open or disengaged, whereupon the proportional valve 42 can be re-opened. In the case of manual closing or engagement of the friction clutch by way of the pedal 42 the admetered volume of hydraulic fluid in the pressure line 30 then has to escape by way of the replenishing system (replenishing region 20) of the master cylinder 16 to the reservoir 22.

If automatic actuation is ongoing and the driver additionally actuates the pedal 54 so as to manually disengage the friction clutch 12, which is recognized by way of the sensor 14 at the master cylinder 16, then the automatic actuation is interrupted by the control unit 40. The volume, which is already or still present in the slave cylinder 28 or portioning cylinder 96, of hydraulic fluid reduces the possible actuation travel at the master cylinder 16 and indicates to the driver that he or she has engaged in an automatic process. However, the driver is always in command and possible undesirable control actions of the control unit can be overridden by the driver. After the intervention of the driver, the system remains passive until the clutch process is concluded. In the case of manual closing or engagement of the friction clutch 12 the volume, which was previously stored by the motor pump 32 in the pressure line 30, of hydraulic fluid then has to escape again by way of the replenishing system (replenishing region 20) of the master cylinder 16 to the reservoir 22.

A hydraulic actuation device for a motor vehicle friction clutch is disclosed, that includes a manually actuatable master cylinder, wherein the actuation is sensed by a sensor. A master pressure chamber is in fluid connection with a reservoir by way of a replenishing region in a rest setting of the mater cylinder. A slave arrangement which has a slave pressure chamber and includes a slave cylinder is operatively connected with the motor vehicle friction clutches. A pressure line connects the master pressure chamber with the slave pressure chamber. In the pressure line, an electrically actuable valve arrangement is connected. A motor pump is connected at the inlet side with the reservoir and is connectible at the outlet side with the pressure line, and a control unit is provided with which the electrical parts (sensor, valve arrangement, motor pump) are connected. The valve arrangement includes, in parallel connection, an electrically actuable proportional valve and a first non-return valve blocking in the direction of the master pressure chamber, while the motor pump is connected by way of a second non-return valve, which blocks in the direction of the motor pump, between the valve arrangement and the slave pressure chamber to the pressure line.

Variations and modifications are possible without departing from the scope and spirit of the present invention as defined by the appended claims.

The invention claimed is:

1. A device for hydraulic actuation of a motor vehicle friction clutch, comprising a manually actuatable master cylinder, the actuation of which is sensed by a sensor and which has a master pressure chamber which in a rest setting is in fluid connection with a reservoir by way of a replenishing region, a slave arrangement, which has a slave pressure chamber and which comprises at least one slave cylinder operatively connected with the motor vehicle friction clutch, a pressure line for hydraulic connection of the master pressure chamber with the slave pressure chamber, a motor pump, which is hydraulically connected at the inlet side with the reservoir and the pump outlet of which is hydraulically connectible with the pressure line, an electrically actuable valve arrangement connected into the pressure line, and a control unit, with which the sensor, the motor pump and the valve arrangement are electrically connected for manual and/or automatic actuation of the motor vehicle friction clutch, the electrically actuable valve arrangement comprises in parallel connection an electrically actuable proportional valve and a first non-return valve blocking in the direction of the master pressure chamber, wherein the electrically actuable proportional valve and the first non-return valve are arranged in parallel between the motor pump and the actuatable master cylinder, the motor pump being hydraulically connected with the pressure line by way of a second non-return valve, which blocks in the direction of the motor pump, between the valve arrangement and the slave pressure chamber.

2. A device according to claim 1, characterized in that the proportional valve is spring-biased into a passage zero setting.

3. A device according to claim 1, characterized in that the slave cylinder comprises a slave piston, which is mechanically connected with the motor vehicle friction clutch, and an abutment serving the purpose of limiting an actuation travel of the slave piston.

4. A device according to claim 3, characterized in that a travel sensor electrically connected with the control unit is provided at the slave arrangement, by which sensor an actuation travel at the slave side and representative of a disengagement state of the motor vehicle friction clutch is detectable.

5. A device according to claim 4, characterized in that the slave arrangement comprises a portioning cylinder which is hydraulically connected upstream of the slave cylinder and which has the slave pressure chamber.

6. A device according to claim 5, characterized in that at least the reservoir, the motor pump, the second non-return valve and the portioning cylinder, together with the travel sensor, are combined to form a module.

7. A device according to claim 6, characterized in that the module also includes the valve arrangement and the control unit.

8. A device according to claim 1, characterized in that the slave cylinder comprises a slave piston, which is mechanically connected with the motor vehicle friction clutch, and an abutment serving the purpose of limiting an actuation travel of the slave piston.

9. A device according to claim 8, characterized in that a travel sensor electrically connected with the control unit is provided at the slave arrangement, by which sensor an actuation travel at the slave side and representative of a disengagement state of the motor vehicle friction clutch is detectable.

10. A device according to claim 1, characterized in that a travel sensor electrically connected with the control unit is provided at the slave arrangement, by which sensor an actuation travel at the slave side and representative of a disengagement state of the motor vehicle friction clutch is detectable.

11. A device according to claim 10, characterized in that the slave arrangement comprises a portioning cylinder which is hydraulically connected upstream of the slave cylinder and which has the slave pressure chamber.

12. A device according to claim 1, characterized in that the slave arrangement comprises a portioning cylinder which is hydraulically connected upstream of the slave cylinder and which has the slave pressure chamber.

13. A device according to claim 12, characterized in that at least the reservoir, the motor pump, the second non-return valve and the portioning cylinder, are combined to form a module.

14. A device according to claim 13, characterized in that the module also includes the valve arrangement.

15. A device according to claim 14, characterized in that said module also includes the control unit.

16. A device according to claim 13, characterized in that said module also includes the travel sensor.

* * * * *